Sept. 10, 1946.   R. T. POUNDS   2,407,513
TARE WEIGHT COMPENSATING APPARATUS FOR WEIGHING SCALES
Filed Oct. 15, 1943

Inventor
Richard T. Pounds
By W. S. McDowell
Attorney

Patented Sept. 10, 1946

2,407,513

UNITED STATES PATENT OFFICE 2,407,513

TARE WEIGHT COMPENSATING APPARATUS FOR WEIGHING SCALES

Richard T. Pounds, Columbus, Ohio, assignor to The Exact Weight Scale Company, Columbus, Ohio, a corporation of Ohio Application October 15, 1943, Serial No. 506,347

6 Claims. (Cl. 265—54)

This invention relates to weighing scales and has particular reference to improved means for use in conjunction with such scales, whereby the latter may be compensated for tare weight variations.

An object of the invention resides in the provision of an improved method and means for quickly, conveniently and accurately causing the weighing lever or beam of a weighing scale to assume a predetermined position of operation or balance prior to each successive weighing function, whereby to compensate for lack of uniformity and variations in the weights of material-receiving containers or other objects applied to such scales.

Ordinarily, in obtaining exact weights of free-flowing materials adapted to be introduced into containers, it is necessary, first, due to variations in the weight of such containers, to place an empty container on the commodity platter of a scale and, by the manipulation of a slidable poise weight, or by the use of removable known weight bodies, or both, to bring the scale to a position of zero balance before the free-flowing material to be weighed is introduced into the containers so positioned.

To illustrate, assume that it is desired to introduce a definite amount of metallic sodium into the hollow stem of the valve of an internal combustion engine. Such valves, it is known, will vary slightly in weight irrespective of the degree of care taken in their manufacture. However, for best results in their use, the amount of sodium introduced into each valve should be maintained at an exacting weight measurement. Therefore, in such an operation, the valve is placed on the commodity receiver carried at one end of the lever of a weighing scale, the lever being then brought into balance by applying solid weights of known value to the weight receiver on the other end of the scale lever, and/or by the adjustment of the slidable poise weight of the lever. With the lever so balanced, a second known weight body, corresponding to the net weight requirements of the full amount of sodium to be introduced into the valve, is applied to the weight receiver of the scale lever and sodium is then introduced in a free-flowing condition into the hollow stem of the valve located on the commodity receiver until the indicator of the scale discloses that the lever is again in balance at the required weight measurement.

These operations are required ordinarily in the critical weighing of free-flowing materials in many widely varying applications, particularly under circumstances preventing weighers from employing averaged tare weights, that is, where the variations in the weights of individual containers may be disregarded and an average weight therefor employed.

Accordingly, it is another object of the present invention to provide means for effecting tare compensation in a weighing scale which overcomes to a very high degree the objections present in prior art systems.

It is another object of the invention to provide manually controllable electrically actuated means for setting the lever of a weighing scale in a desired operating position prior to the weighing of commodities thereby.

It is a further object of the invention to provide conveniently and quickly operating electrical means adapted for cooperation with the lever, or other movable weighing element of a scale, for bringing said lever or element to a predetermined operating position in compensating for variation in the tare weights of material containers or other objects whereby to facilitate the obtaining of precise weights of free-flowing materials introduced into such containers and to lessen the time required in obtaining such adjustments or adaptations.

For a further understanding of the invention, reference is to be had to the following description and the accompanying drawing, wherein.

Figure 1:
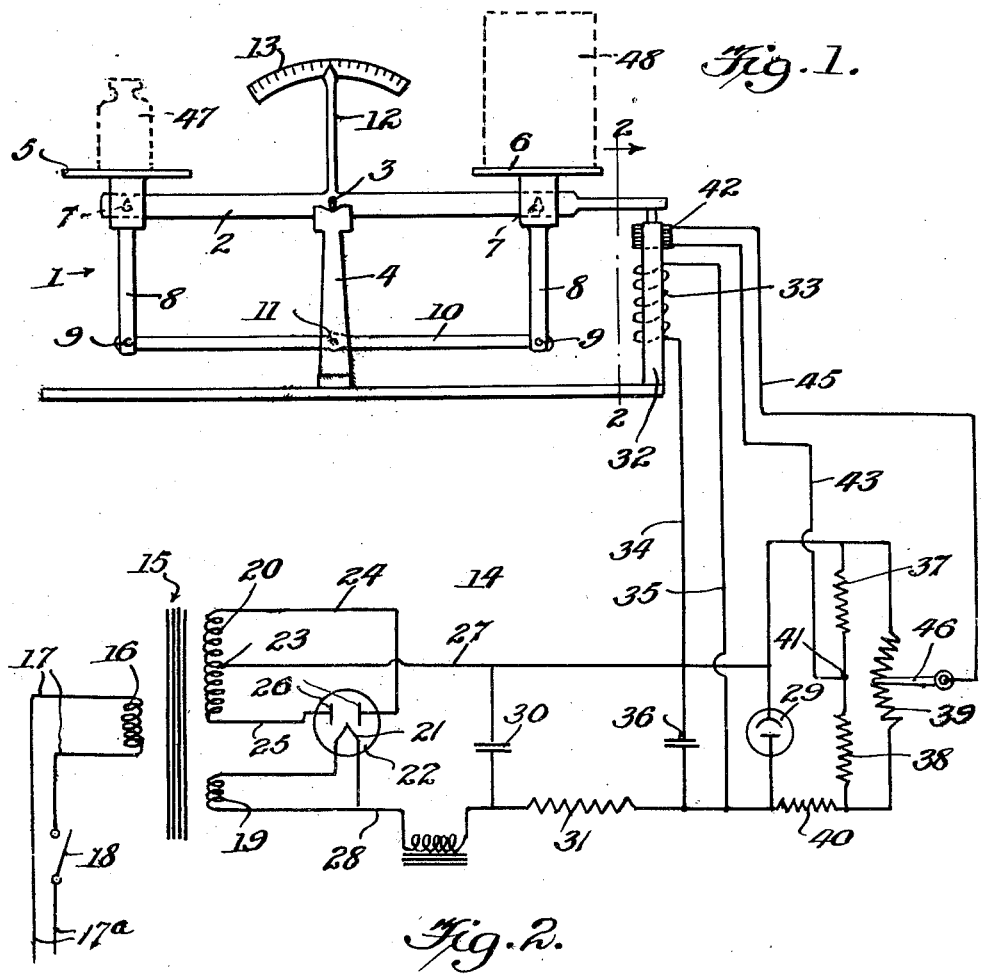
Fig. 1 is a diagrammatic view of a weighing scale provided with the magnetic tare weight compensating means comprising the present invention.
Figure 2:
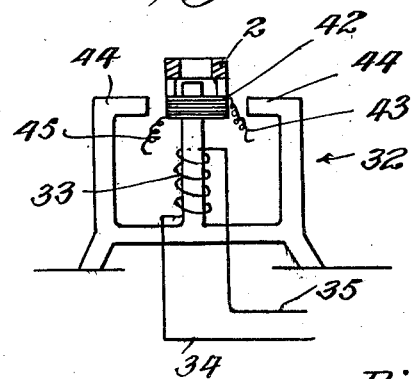
Fig. 2 is a sectional view on the line 2—2 of Fig. 1.

Referring to the drawing, the numeral 1 designates generally a weighing scale of the so-called even-balance type. This form of scale has been depicted for convenience in illustration and description, as it will be understood that the features of the present invention are applicable to weighing scales generally and not to any specific type of scale. The scale, however, as illustrated, comprises a weighing lever 2 which is centrally pivoted as at 3 on a supporting bracket 4. At points spaced substantially equidistantly from the pivot 3, the ends of the lever pivotally carry a known-weight receiver 5 and a commodity-receiver 6, the said receivers being carried, as usual, by knife edge fulcrums 7. The depending stems 8 of said receivers have their lower ends pivotally connected as at 9 to the opposite ends of a check link 10, the latter being centrally pivoted as at 11 to the bracket 4 in substantially vertical registration with the lever fulcrums 3.

Associated with the lever 2 is an indicator 12, which is movable over a calibrated surface 13. The indicator 12 has been illustrated as being of a simple well-understood type but it will be understood that any of the standard motion-multiplying indicators now commonly used in connection with scales of this category may be employed.

To correct such a scale for variations in the tare weight of containers or other objects applied to the commodity receiver 6, I employ in association with one end of the lever 2 a manually controllable electromagnetic means, designated generally by the numeral 14. Through the operation of this means, the lever may be attracted or repelled and oscillated about its central fulcrum to assume a desired weighing position. Conveniently, since standard alternating current is so readily available over commercial circuits, this means embodies a combination step-up and step-down transformer 15 which has its primary winding 16 formed for connection with the leads 17 of an alternating current circuit 17a, in which may be located a control switch 18.

Further, the transformer may embody two secondary windings, indicated at 19 and 20, the winding 19 developing voltage of a low order (5 volts) for heating the filament 21 of an electronic rectifier tube 22, and with the winding 20 developing a potential of approximately 700 volts. A center tap 23 may be disposed at approximately the mid point of the winding 20, while the extreme ends of this winding are connected by means of conductors 24 and 25 with the anode plates 26 of the rectifier tube 22, this completing the elements of a full wave rectifier, transforming alternating into direct current.

Leading from the center tap 23 is a conductor 27 and from one side of the secondary winding 19 a complemental conductor 28, over which conductors the direct current output of the rectifier is passed. The conductors 27 and 28 extend in a preferred arrangement to the internally positioned elements of an electronic voltage-regulatin tube 29, the direct current, prior to being applied to the tube 29, being filtered usually by a fixed condenser 30 connected across the conductors 27 and 28 and further modified by a voltage-dropping resistance, disclosed at 31, arranged in the positive conductor 28.

Positioned adjacent to one end of the scale lever 2 is an electromagnet 32, the same having a coil winding 33 which is joined by conductors 34 and 35 with the conductors 27 and 28, respectively, in association with an additional filter condenser 36 arranged in parallel relation with the condenser 30. The purpose of the voltage-regulating tube 29 is to maintain a constant potential across the field winding 33 of the magnet regardless of variations in the potential existing in the current supplying circuit 17.

Additional fixed resistances, each of equal value, are indicated at 37 and 38. These resistances are connected in series with the conductors 27 and 28 and in parallel relation with a potentiometer or variable resistance, indicated at 39, forming an equal-arm bridge, the resistances 37 and 38 being supplied with a potential from the previously described direct current source and, also, through a second voltage-dropping resistance 40. A mid tap 41 located between the resistances 37 and 38 is connected to one terminal of a moving coil 42 by means of a conductor 43, said coil being rigidly attached to the end of the lever 2 located between the spaced poles 44 of the magnet field member 32. The other terminal of the coil 42 is connected by means of a conductor 45 with the manually movable controlling arm 46 of the potentiometer or variable resistance 39.

When the system is in operation, the energized electromagnet causes a magnetic field to be established between the terminals or pole pieces of its field assembly. The moving coil 42 is so mounted and constructed that the lines of force established between the terminals 44 are caused to flow through its windings. Since the coil 42 is composed of non-magnetic materials, it is neither attracted to nor repelled by the electromagnet, that is, providing no current is flowing through the windings of the coil 42, as is the case when the even balance bridge is at the exact point of electrical balance. However, if the arm 46 of the potentiometer is moved in either direction from such a position of balance, the resistance values of the bridge are upset and current is caused to flow through the coil 42 in a direction and magnitude dependent upon the direction and amount of unbalance of the bridge. When current is caused to flow through the coil 42, it creates additional electromagnetic forces which, in turn, are attracted to or repelled from the electromagnet, said repulsion being again dependent upon the unbalance of the bridge circuit.

Through the design of the electromagnet and the moving coil, I correlate this attraction or repulsion with definite amounts of unbalance in the associated scale system. Thus if the scale is previously dynamically balanced with no current flowing through the coil 42 and then unbalanced by depositing a given weighing mass on one extreme of the weighing lever, rotation of the potentiometer control arm will cause current to flow through the coil 42 and the opposing or attracting magnetic forces utilized for reestablishing mechanical balance of the scale lever.

In the use of the apparatus, a weight 47 is deposited on the weight receiver 5, said weight having a value approximating that of a material container 48 situated on the commodity receiver 6. If the container 48 should be more or less over or under the weight of that of the known or fixed weight 47, the scale lever will be rocked and the extent of its deflection from balance may be observed on the indicator of the scale. Ready compensation for this condition may then be obtained by turning the operating control of the potentiometer 39 either to the left or right of its normal position, creating magnetic forces which operate to restore the scale lever to its desired zero position of balance. A second fixed weight is then applied to the weight receiver 5 corresponding to the net weight of the material to be introduced into the container 48, and after which any free-flowing material may be introduced into the container until the final balance of the lever, as disclosed by the indicator, is obtained.

In effecting such tare weight compensation, the weigher is merely required to actuate manually the control of the potentiometer, there being no manipulation of poise weights or the application of small additional fixed weights to the scale in effecting the desired correction. The construction provides for obtaining rapid compensation in such cases over a wide range of weight variations and, when desired, minute increments of weight. It will be understood that in the event direct current of desired values are available, the alternating current rectifier is not employed. Other variations may be made in specific structure with-

I claim:

1. The combination with a weighing scale of the type having a lever pivotally mounted at its center and carrying weight receivers adjacent to its ends, of magnetic means for establishing a localized magnetic field adjacent to said lever in spaced relation from its central pivotal mounting, a coil carried by said lever and arranged in said field to receive the lines of force thereof, and manually regulable means for effecting the passing of direct current in varying magnitude and in either direction through said coil to produce controlled magnetic forces attracting or repelling said lever, whereby to cause the lever to assume under such magnetic action a desired weighing position.

2. The combination with a weighing scale having an element movably responsible to the application of weights to the scale, means for establishing a localized uni-directional constant strength magnetic field immediately adjacent to said element, a non-magnetic conductor carried by said element for movement in unison therewith and disposed in said field, and manually regulable means for effecting the passage of direct current in varying magnitudes and in selectively opposing directions through said conductor, whereby to produce non-frictional controlled magnetic forces for maintaining the movable element of said scale in a desired weighing position.

3. Means for compensating weighing scales for tare weight variations, comprising an electrically energizable coil adapted to be mounted for movement in unison with the weighing lever of a scale, an electromagnet having a field assembly formed with spaced poles between which said coil is disposed, a winding on said field assembly, a direct current circuit joined with said winding, a resistance shunt potentiometer in said circuit, said potentiometer having a manual control, and conductors leading from said potentiometer to said movable coil and operative to pass current in either direction through said coil and at different magnitudes upon selective operation of said manual control.

4. Tare weight compensating means for weighing scales comprising a coil carried by the movable operating lever of a weighing scale, means for establishing a localized uni-directional magnetic field adjacent to said coil, said means including a direct current circuit having a pair of spaced parallel conductors, a pair of fixed series united resistance units of equal value connected with and arranged between said conductors, a variable resistance unit having a manually operated controlling element joined with said conductors in parallel relation to the fixed resistance units, a lead united at one end with said circuit between said fixed resistance units and at its other end with one terminal of the movable lever coil, and a second complemental lead united with the control of said variable resistance and extending to the other terminal of the lever coil.

5. Apparatus for controlling the operating position of the lever of a weighing scale to adapt the same for tare weight variations comprising an electromagnet having a core provided with spaced poles and a winding around said core, means for supplying said winding with direct current maintained under constant potential values, a coil composed of non-magnetic material movable with the lever of an associated scale, said coil being disposed between the spaced poles of the magnet core, and manually controlled resistance means joined with said source of direct current supply and leading to said coil, said resistance means serving upon actuation to transmit current through said coil in different directions and in differing magnitudes.

6. Apparatus for controlling the operating positions of the lever of a weighing scale to correct the latter for tare weight variations comprising a coil attached to and movable in unison with the lever of an associated scale, an electromagnet having a field assembly formed with spaced poles between which said coil is positioned, a direct current circuit leading to said magnet, a pair of spaced fixed resistance units united with said circuit, a manually controlled potentiometer arranged in shunting relationship with said resistances, a lead extending from the control of said potentiometer to one end of said coil and a second lead extending from said circuit between said fixed resistances to the other end of said coil, the manual operation of said potentiometer serving to vary the resistance values in said circuit to provide for the passage of current in selected directions through said coil.

RICHARD T. POUNDS.